UNITED STATES PATENT OFFICE.

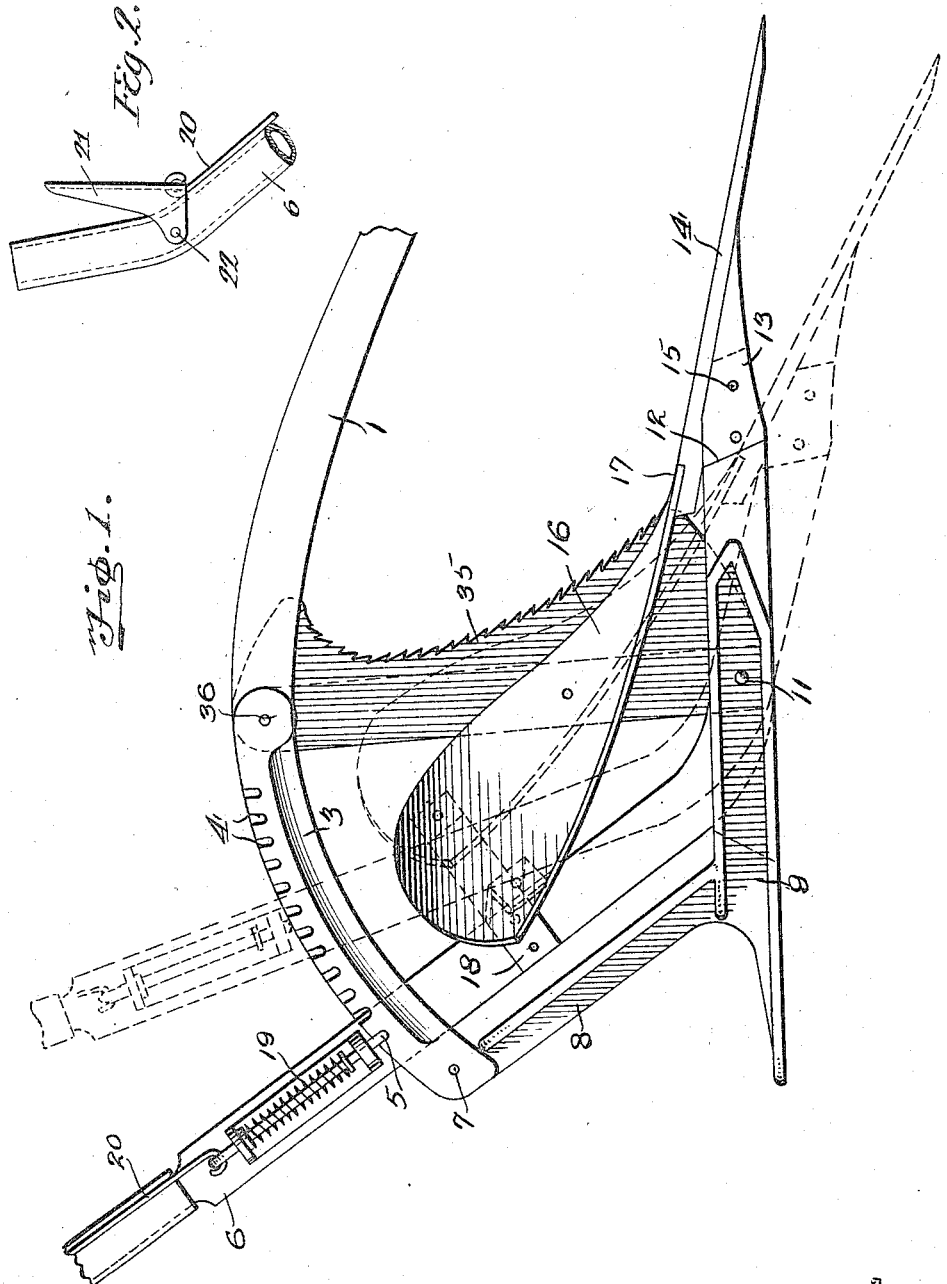

MARIANO J. SALAS, OF MOLO, ILOILO, PHILIPPINE ISLANDS.

PLOW.

1,237,825.     Specification of Letters Patent.     Patented Aug. 21, 1917.

Application filed July 13, 1915. Serial No. 39,623.

*To all whom it may concern:*

Be it known that I, MARIANO J. SALAS, citizen of the United States, residing at Molo, in Iloilo, Philippine Islands, have invented certain new and useful Improvements in Plows, of which the following is a specification.

My invention relates to improvements in that class of plows in which the plow point is so mounted that it can be adjusted to the desired angle with respect to the line of draft and according to the condition of the soil to be turned or disrupted and the particular work to be performed thereby.

The invention may be said to consist in the special construction of plow hereinafter fully described, specifically set out in the appended claim and illustrated in the accompanying drawings, in which:

Figure 1 is a side elevation, partly broken away, of a plow constructed in accordance with the present invention, the dotted lines showing the plow point adjusted to its vertical or digging position;

Fig. 2, is a detail view of the upper end of the combined handle and plow adjusting lever.

Like numerals of reference designate like parts throughout the several views.

The plow beam 1 is curved downwardly as at 3, the curved portion affording a segmental rack bar structure 4 with which a pawl 5 mounted on the plow point adjusting lever 6 is engageable. The said beam 1 at its rear end is affixed as at 7 to a standard 8 integral with a suitable shoe or runner 9 which is adapted for engagement with the soil, the horizontally flat underneath side of the runner directly contacting the bottom of the furrow made during advancement of the plow.

The lever 6 is curved forward at its lower end and is pivoted at 11 to the forward end of the runner 9, with the lower terminal of the lever extended forward and beyond the pivotal point thereof as shown in Fig. 1. The lever 6 terminates at its curved forward end in an abutment shoulder 12, said shoulder being engaged by an enlargement 13 of the plow point 14, said enlargement having a detachable connection as indicated at 15 with the forward end of the lever. Plow point 14 is equipped with a common type of mold-board 16, the point of connection between the mold-board and the plow point being designated 17 in Fig. 1 of the drawings.

Operation of the pawl 5 before mentioned may be effected in any of several well known ways, it being preferred however to so mount the pawl upon the lever 6 that it will yieldingly interlock with the teeth of the rack bar structure 4, the pawl being equipped with an operating spring 19, a connecting rod 20 and a pawl operating lever 21. Lever 21 is pivoted to the lever 6 as indicated at 22 and at a point in proximity to the handle portion of the said lever.

It will be noted that the lever 6 is intended also to be used in guiding the plow when the same is drawn by a draft animal, and in this manner the lever is in the nature of a combined plow handle and plow adjusting lever. As the plow is intended primarily for use in sandy and soft soil, the handle constructed in this manner is amply sufficient for its purpose. Attention is also called to the fact that the plow structure including the plow point 14 and mold board 16 is mounted upon the forward lower extremity of said lever 6 whereby when the lever is oscillated the plow structure is moved bodily in an arc of a circle thereby permitting the adjustment thereof relative to the line of draft of the plow.

In reduction to practice, I have found that the form of my invention, illustrated in the drawings and referred to in the above description, as the preferred embodiment, is the most efficient and practical; yet realizing that the conditions concurrent with the adoption of my device wll necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In a plow, a plow beam formed with a ground engaging runner, a combined plow handle and lever disposed in a substantially vertical position, and having its lower terminal curved forward and pivoted to the runner whereby the lower extremity of said lever may extend forward of the pivotal point thereof, a plow structure including a plow point and mold board mounted on said extremity of said lever whereby by oscillating the lever the plow structure may be moved bodily in an arc to vary the angle of said structure relative to the line of draft, and means for locking the lever to the plow subsequent to adjustment.

In testimony whereof I affix my signature in presence of two witnesses.

MARIANO J. SALAS.

Witnesses:
FRANCISCO TULUETU,
VIRGILIO J. NIANTINOLO.

Copies of this patent may be obtained for five cents each, by addressing the "Commissioner of Patents, Washington, D. C."